United States Patent
Saguchi et al.

(10) Patent No.: US 11,724,838 B2
(45) Date of Patent: Aug. 15, 2023

(54) METHOD FOR PRODUCING POLYMER TUBE CONTAINING LIQUID AND BEING SEALED AT CONSTANT INTERVALS AND APPARATUS FOR PRODUCING POLYMER TUBE

(71) Applicant: SHIN-ETSU CHEMICAL CO., LTD., Tokyo (JP)

(72) Inventors: Ryuichi Saguchi, Joetsu (JP); Tomoaki Kaji, Joetsu (JP); Masahiko Naruse, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 573 days.

(21) Appl. No.: 16/984,285

(22) Filed: Aug. 4, 2020

(65) Prior Publication Data

US 2020/0361643 A1 Nov. 19, 2020

Related U.S. Application Data

(62) Division of application No. 15/941,309, filed on Mar. 30, 2018, now Pat. No. 10,865,002.

(30) Foreign Application Priority Data

Mar. 31, 2017 (JP) ................. 2017-071473

(51) Int. Cl.
*B65B 51/22* (2006.01)
*B65B 3/02* (2006.01)
(Continued)

(52) U.S. Cl.
CPC .............. *B65B 3/022* (2013.01); *B29C 48/00* (2019.02); *B29C 48/0019* (2019.02);
(Continued)

(58) Field of Classification Search
CPC ..... B29C 48/00; B29C 48/09; B29C 48/0019; B29C 48/0021; B29C 48/11;
(Continued)

(56) References Cited

U.S. PATENT DOCUMENTS 2,382,175 A   8/1945   Salfisberg
3,696,179 A   10/1972  Jacobs
(Continued)

FOREIGN PATENT DOCUMENTS

FR   2439078 A1   5/1980
GB   591402       8/1947
(Continued)

OTHER PUBLICATIONS

Extended European Search Report, dated Oct. 10, 2018, tor corresponding European Application No. 18165427.8.
(Continued)

*Primary Examiner* — James D Sells
(74) *Attorney, Agent, or Firm* — Birch, Stewart, Kolasch & Birch, LLP

(57) ABSTRACT

Provided are a method and an apparatus for extruding into a tube and filling the tube at a high speed and simultaneously sealing the tube. Specifically provided is a method for producing a polymer tube, containing a liquid therein and being sealed at constant intervals, the method including an extrusion step of continuously melt-extruding a polymer material through a die into at least one tube, while feeding a liquid into the tube to obtain at least one liquid-containing tube; and sealing step of discontinuously pressing the at least one liquid-containing tube between a pair of pressurizing members at constant intervals to cause pressure-bonding before the tube solidifies, while continuously taking up the extruded tube.

6 Claims, 7 Drawing Sheets

(51) Int. Cl.
  *B65B 3/30* (2006.01)
  *B65B 61/02* (2006.01)
  *B29C 65/06* (2006.01)
  *B29C 48/09* (2019.01)
  *B29C 48/00* (2019.01)
  *B65B 65/00* (2006.01)
  *B65B 39/06* (2006.01)
  *B65B 37/00* (2006.01)
  *B65B 39/00* (2006.01)
  *B65B 63/08* (2006.01)
  *B65B 9/24* (2006.01)
  *B65B 51/32* (2006.01)
  *B29C 48/11* (2019.01)
  *B65B 51/16* (2006.01)
  *B29K 23/00* (2006.01)
  *B29C 48/29* (2019.01)
  *B29C 48/13* (2019.01)
  *B29C 48/88* (2019.01)
  *B29C 48/345* (2019.01)
  *B29C 48/30* (2019.01)

(52) U.S. Cl.
  CPC .......... *B29C 48/0021* (2019.02); *B29C 48/09* (2019.02); *B29C 48/11* (2019.02); *B29C 65/0672* (2013.01); *B65B 3/30* (2013.01); *B65B 9/24* (2013.01); *B65B 37/00* (2013.01); *B65B 39/001* (2013.01); *B65B 39/06* (2013.01); *B65B 51/16* (2013.01); *B65B 51/225* (2013.01); *B65B 51/32* (2013.01); *B65B 61/02* (2013.01); *B65B 63/08* (2013.01); *B65B 65/006* (2013.01); *B29C 48/13* (2019.02); *B29C 48/29* (2019.02); *B29C 48/30* (2019.02); *B29C 48/345* (2019.02); *B29C 48/9115* (2019.02); *B29K 2023/065* (2013.01); *B65B 2220/24* (2013.01)

(58) Field of Classification Search
  CPC .......... B29C 65/0672; B29K 2023/065; B65B 51/16; B65B 51/225
  USPC ...................................... 156/580.1
  See application file for complete search history.

(56) References Cited

U.S. PATENT DOCUMENTS 4,290,996 A    9/1981    Hayashi et al.
8,783,324 B2 *    7/2014    Ippers .................. B29C 65/087
                                                             156/580.2

FOREIGN PATENT DOCUMENTS

JP          49-38789 A      4/1974
JP          7-148812 A      6/1995
WO      WO 00/79206 A1     12/2000

OTHER PUBLICATIONS

Partial European Search Report (R. 64 EPC) dated Jun. 18, 2018, issued in European Patent Application No. 18165427.8.

* cited by examiner

METHOD FOR PRODUCING POLYMER TUBE CONTAINING LIQUID AND BEING SEALED AT CONSTANT INTERVALS AND APPARATUS FOR PRODUCING POLYMER TUBE

CROSS-REFERENCE TO RELATED APPLICATION

This application is a Divisional application of co-pending application Ser. No. 15/941,309, filed on Mar. 30, 2018, which claims the benefit under 35 U.S.C. § 119(a) to Patent Application No. 2017-071473, filed in Japan on Mar. 31, 2017, all of which are hereby expressly incorporated by reference into the present application.

BACKGROUND OF THE INVENTION

1. Field of the Invention

The invention relates to a method for producing a polymer tube sealed and containing a liquid substance such as a pheromone, a flavoring agent, an insect repellent and an insecticide in a form liquid or solution, and to an apparatus for producing a polymer tube.

2. Related Art

There is a conventional packing method for filling a polymer tube with a fluid substance, a jelly-like substance, or the like. The conventional method comprises steps of: sealing a long tube at one end, feeding a substance into the tube from the other end, and sealing and cutting the tube at a certain length. In the method, such a long polymer tube cannot be produced so that it is necessary to feed the substance into each tube, preventing continuous packing.

When an inner diameter of a tube is required to be controlled, JP 7-148812A discloses a method for continuously producing a polymer tube, comprising a step of controlling the inner diameter by a mandrel protruding forward from an extruder, while cooling the tube for solidification from the inner surface by using a substance to be fed as a refrigerant. The tube into which the substance is fed is taken up and then sealed and cut with a seal cutter. JP 49-38789A discloses a method for producing a sustained-release preparation having an inner diameter of 0.4 to 4 mm, comprising steps of extruding a melted polymer material, while injecting a volatile substance in a form of liquid. Also in the method, an extruded tube is heat-sealed and cut at a certain length.

SUMMARY OF THE INVENTION

A polymer tube containing a substance in a form of liquid or fluid therein is conventionally sealed by the method comprising steps of extruding a polymer material into a tube; solidifying the tube to fix the inner diameter or the wall thickness of the tube; and melting the tube again for heat-sealing, ultrasonic sealing, or the like. Such sealing requires time for preheating, pressure-bonding, and cooling after retention of pressure-bonding. Hence, the speed of taking up the extruded tube has to be limited in order to allow the tube to be continuously extruded and sealed. For this reason, when a polymer tube is taken up at a high speed, the sealing has to be done in a separate step or line.

In such circumstances, the invention is made to provide a method for producing a polymer tube, in which a polymer tube is extruded and filled with a liquid substance at a high speed, and simultaneously sealed; and an apparatus for producing the polymer tube.

In an aspect of the invention, there is provided a method for producing a polymer tube, containing a liquid therein and being sealed at constant intervals, the method comprising: an extrusion step of continuously melt-extruding a polymer material through a die into at least one tube, while feeding a liquid into the at least one tube to obtain at least one liquid-containing tube; and a sealing step of discontinuously pressing the at least one liquid-containing tube between a pair of pressurizing members at constant intervals to cause pressure-bonding before the tube solidifies, while continuously taking up the extruded tube.

In another aspect of the invention, there is provided an apparatus for producing a polymer tube, containing a liquid therein and being sealed at constant intervals, the apparatus comprising: a die configured for melt extrusion of a polymer material into at least one tube; a mandrel configured to feed a liquid into the at least one tube during the melt extrusion to obtain at least one liquid-containing tube; one or more rollers configured to take up the at least one liquid-containing tube; and a pair of pressurizing members configured to discontinuously press the at least one liquid-containing tube between the pair of pressurizing members to cause pressure-bonding before the tube solidifies.

According to the invention, a polymer tube containing a liquid therein and being sealed at constant intervals is produced by extrusion of a polymer material into a tube, feeding of the liquid into the tube and sealing, while maintaining a speed of taking up the extruded tube. Hence, it is not necessary to provide a sealing device separately so that the steps are carried out in a simpler manner and in a shorter period of time.

DETAILED DESCRIPTION OF THE PREFERRED EMBODIMENTS

Figure 1:
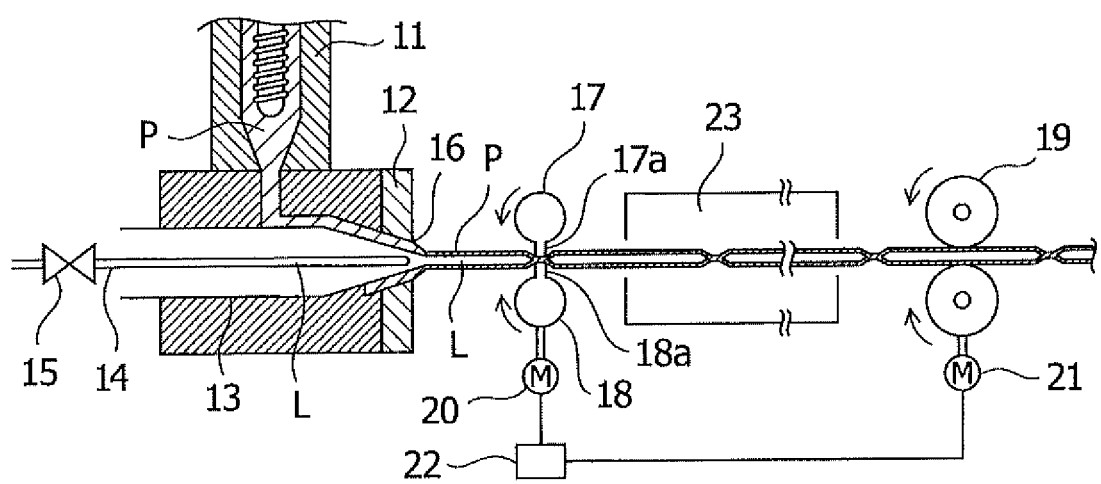
FIG. 1 is a top cross-sectional view of an embodiment of apparatus for producing a polymer tube containing a liquid substance therein and sealed at constant intervals.

A method for producing a polymer tube, containing a liquid substance therein and sealed at constant intervals, comprises an extrusion step of continuously melt-extruding a polymer material through a die into at least one tube, while feeding a liquid substance into the at least one tube to obtain at least one liquid substance-containing polymer tube; and a sealing step of discontinuously pressing the at least one liquid substance-containing tube between a pair of pressurizing members at constant intervals to cause pressure-bonding before the polymer tube solidifies, while continuously taking up the extruded polymer tube.

A polymer tube is molded by extruding a melted polymer material through a die into a tube. A conduit is preferably inserted into a pore of a mandrel placed in the die, and the leading end thereof is placed near a discharge port of the die for discharging a melted polymer material. A liquid substance is discharged from the conduit.

Although a single polymer tube may be extruded from a die, two or more polymer tubes may be simultaneously extruded. Of two or more polymer tubes, at least one tube may be filled with a liquid substance. Examples of the two or more polymer tubes may include a combination of tubes, or a combination of at least one tube and at least one rod. Of two or more polymer tubes, at least two may be connected by a web. The web is, for example, a continuous connecter interconnecting a tube and a tube, a tube and a rod, or a rod and a rod in a longitudinal direction.

When a die comprises a cross-section having two pores, two polymer tubes are obtained in the extrusion step, and two polymer tubes sealed and thereby simultaneously connected at constant intervals, each tube containing a liquid substance, are obtained in the sealing step.

When a die comprises a cross-section having two pores and a slit communicating with the two pores, two polymer tubes connected by a web are obtained in the extrusion step, and two polymer tubes sealed at constant intervals and connected by a web are obtained in the sealing step.

When a die comprises a cross-section having two pores and a slit communicating with the two pores, and one of the rotary horns has a blade which protrudes radially higher than the protrusion on the circumference, two polymer tubes connected by a web are obtained in the extrusion step, and the polymer tubes are not only pressure-bonded between protrusions of the rotary horns but also notched in the web by the blade along the longitudinal direction except the pressure-bonded parts in the sealing step. Consequently, two polymer tubes sealed at constant intervals and connected by a notched web, each containing a liquid substance, can be produced.

A polymer tube for storing a liquid substance can be produced by continuous extrusion molding using a polymer material. The inner diameter of the polymer tube may be selected depending on required characteristics of an end product, and may be variable with the number of extruded tubes. It is preferably 0.4 to 2 mm, more preferably 0.6 to 1.6 mm from the standpoint of moldability or the feeding property of a liquid substance. By selecting the sealing intervals depending on the inner diameter of a polymer tube, an amount of a liquid substance contained in a polymer tube sealed at both ends, which are obtained by cutting at sealed parts, may be controlled.

The polymer tube preferably has a wall thickness of 0.2 to 1.5 mm, more preferably 0.25 to 0.8 mm from the standpoint of moldability, the diffusion speed of the liquid substance, or economy.

When two or more polymer tubes are obtained by extrusion, the gap between the polymer tubes may be selected by preferably adjusting the minimum distance between the outer peripheries of pores in a die to a range of 0.5 to 5 mm. When polymer tubes are connected by a web, the width of the web connecting the polymer tubes is selected by preferably adjusting the width of a slit in a die (wherein the width is the minimum distance between the outer peripheries of pores in a die) to a range of 0.5 to 5 mm and preferably adjusting the thickness of the slit (wherein the thickness is perpendicular to the width) to a range of 0.1 to 0.5 mm.

The processing temperature during the molding of a polymer material is typically about 80 to 300° C., which may vary with the type of a polymer material. For example, when a high-density polyethylene is selected as the polymer material, the extruder is preferably set at 180 to 250° C., and the die is preferably set at 250° C. When an ethylene-vinyl acetate copolymer is selected as the polymer material, the extruder is preferably set at 130 to 170° C., and the die is preferably set at 170° C. When an aliphatic polyester is selected as the polymer material, the extruder is preferably set at 70 to 130° C., and the die is preferably set at 130° C.

As described above, the processing temperature depends on the type of a polymer material. An optimum temperature at which a polymer material can be extruded uniformly may be selected to obtain an intended tube.

The take-up speed of the polymer tube is preferably controlled at a constant value. When the amount of a polymer material extruded from an extruder and the inner diameter of a tube are constant, the wall thickness of the tube may be appropriately controlled by changing the take-up speed of the polymer tube.

The take-up speed of the polymer tube varies with the extruder performance, a shape of the tube, or physical properties of the polymer material. It is preferably 20 to 300 m/min, more preferably 40 to 200 m/min. When the take-up speed is less than 20 m/min, the productivity may be lowed. When the take-up speed is more than 300 m/min, an amount of the polymer material extruded per unit time becomes large so that a large extruder or a device for after-treatment including winding of the polymer tube may be needed, or the polymer tube may lack dimensional stability.

A pair of pressurizing members discontinuously press a polymer tube being taken up to cause pressure-bonding at constant time intervals before the polymer tube is cooled and solidified. As a result, the polymer tube is sealed. The pair of pressurizing members may be any pressurizing members which can discontinuously pressure-bond a polymer tube from both sides. For example, each pressurizing member comes closer to a polymer tube from the corresponding side in a direction perpendicular to the take-up direction at intended time intervals, then instantaneously pressure-bonds the polymer tube, and gets away. Such a cycle can be repeated. In order not to change the take-up speed when a pressure is applied, each pressurizing member preferably may comprise a freely rotatable part (e.g. head) which comes into contact with the polymer tube during application of pressure. Each pressurizing member is preferably a member made from a metal such as iron, aluminum, and stainless steel; a hard rubber; or a plastic such as a rigid plastic.

A pair of pressurizing members is preferably a pair of rotary horns, each having a protrusion. A polymer tube is allowed to pass between the pair of rotary horns, and the protrusions discontinuously pressure-bond the polymer tube for sealing. Preferably, the pair of rotary horns rotates at the same peripheral speed as the take-up speed so as to transfer the polymer tube in the take-up direction.

The material of the rotary horn may be any material having a higher hardness than that of a melted polymer material, and more preferably a metal such as iron, aluminum and stainless steel; a hard rubber; or a plastic such as a rigid plastic is used.

As for the shape of the protrusion for sealing, a dimension of a flat part on the leading end substantially corresponds to a sealing width of a polymer tube. The sealing width is suitably about 4 to 15 mm. It is important not to allow a liquid substance to leak from the sealed part when the sealed part is cut in the middle thereof. When an edge of the protrusion sharply comes into contact with a polymer tube, the wall of the polymer tube is drawn into a thin wall, which may cause the leakage of a liquid substance. Hence, the edge of the protrusion is preferably chamfered into an R-shape. The R-shape preferably has a radius of 0.1 to 1 mm, which may vary with the width of a flat portion.

Each rotary horn excluding the protrusion may be of any shape which allows it to come into contact with neither a polymer tube nor a sealed polymer tube except that the blade is allowed to come into contact with a web. Examples of the shape include a cylinder (including a disc) and a quadrangular prism. The cylinder is more preferable.

A polymer tube is pressure-bonded between the protrusions of the pair of rotary horns. However, when two protrusions come in contact with each other, the tube is cut. Accordingly, the rotary horns may preferably have a clearance of 0.3 to 1.0 mm so that the tube can be flattened, while leaving a certain thickness.

A pair of rotary horns preferably rotates at the peripheral speed equal to the take-up speed. A pair of rotary horns preferably rotates in such a manner that a polymer tube is moved in the same direction as the take-up direction. Hence, the rotary horns rotate in opposite directions, and the direction in which each protrusion comes closer for pressure bonding and gets away after pressure-bonding, is the same direction as the take-up direction. The peripheral speed is the same as the take-up speed. This suppresses an influence on the take-up speed of a polymer tube before, during and after sealing, and enables the sealing with a pair of rotary horns.

When the peripheral speed of rotary horns is the same as the take-up speed, the circumference formed by the radius of the rotary horn including the protrusion is equal to the sum of each length of constant intervals for sealing a polymer tube containing a liquid substance therein and the length of a sealed part. For example, to obtain a polymer tube sealed at each pitch of 200 mm, cylindrical rotary horns having a radius (including a protrusion) of 31.85 mm can be used. Alternatively, by setting an idle period of the rotation cycle of the rotary horn, an intended interval can be selected. For example, to obtain a polymer tube sealed at each pitch of 400 mm, cylindrical rotary horns having a radius (including a protrusion) of 31.85 mm can be used to repeat a cycle in which the rotary horns are stopped for a time of one revolution and then are rotated for one revolution.

To allow the rotary horns to rotate at the same speed as the take-up speed, for example, the speed of a rotary motor for the take-up roller is measured, and then an electric signal is sent to a rotary motor controller of the rotary horns. For example, when a change in voltage or the like causes a change in the rotation speed of a rotary motor for the take-up roller, the peripheral speed of the rotary horns can be controlled. As a result, the sealing can be done at constant seal pitches.

A long polymer tube after extruded from a die and before cooled and solidified is flattened and sealed by pressurizing members such as both protrusions of a pair of rotary horns. A polymer tube is preferably allowed to pass through a cooling bath such as a water bath to be cooled and solidified to obtain a sealed polymer tube. An extruded polymer tube may be sealed before introduction into the cooling bath. Alternatively, a polymer tube just after the extrusion may be sealed in the cooling bath in which a pair of rotary horns is placed. It is preferable to seal a polymer tube when the outer surface layer of a polymer tube starts to solidify, but the inner wall surface is still in a molten state. The temperature of the cooling bath for sealing (first cooling bath) may be any temperature at which the outer surface is solidified, and is preferably 20 to 60° C., more preferably 25 to 40° C. The sealed polymer tube is completely solidified in a subsequent cooling bath (second cooling bath) at a temperature 10 to 30° C. lower than that of the first cooling bath. It is preferable to use two or more cooling baths. However, it is possible to use only a single cooling bath which preferably has a temperature of 15 to 60° C.

When two polymer tubes has an interconnecting web, the web of the polymer tubes or the web of the polymer tubes cut at the middle of sealed parts is preferably notched at the middle of the web in a longitudinal direction by using a cutting device such as a cutter. By tearing the notch, the resulting polymer tubes can be placed through a tree branch or the like. When one of the rotary horns has a blade which protrudes radially except at a location of the protrusion and which protrudes more than the protrusion, it can flatten the extruded tubes together with the other of the rotary horns and can notch the web in a longitudinal direction. The other of rotary horns preferably has a blade receiver with a groove wherein the receiver is formed circumferentially except at a location of the protrusion. Such a structure allows the blade to be inserted into a groove, while a web is notched. Accordingly, predetermined positions on the web can be notched without displacement. The blade and the blade receiver with a groove are preferably provided on the periphery of each rotary horn except at a location of each protrusion in such a manner as to form a gap having a length of from 5 mm to ¼ of the outer periphery of each rotary horn (including each protrusion) at each side of the protrusion. Specifically, the material of the blade receiver with a groove is preferably a heat resistant resin such as polyamide and polytetrafluoroethylene.

The polymer tube is cut preferably perpendicularly to the longitudinal direction at the sealed parts formed by flattening with pressurizing members of a pair of rotary horns or the like, preferably at the middle of each sealed part in a longitudinal direction to obtain short polymer tubes sealed at both ends, each sealed tube containing a liquid substance such as a pheromone therein. The cutting device is not specifically limited, and a cutter such as a knife may be used.

The amount of the liquid substance contained in a polymer tube sealed at both ends may be any amount, and may be selected depending on required characteristics of an end product. As an example, a sustained-release preparation for disrupting mating will be described. For example, each polymer tube sealed at both ends and containing a sex pheromone therein is placed in a field, and the sex pheromone is gradually released to make the whole field in a sex pheromone atmosphere. Thus, intended insect pests are prevented from mating, thereby lowering the population density of the next generation.

It is considered that as the number of sustained-release preparations placed in a field is larger, the pheromone concentration can become more uniform in the whole field. In consideration of the time and effort for the placement, the placement of 20 to 5,000 preparations per hectare is thought to be a preferable allowable range. The amount of a pheromone required for mating disruption naturally varies with the population density and sensitivity of intended insect pests. It is typically and preferably 0.1 to 10 g/day/hectare of a pheromone. As for the period for the release of a pheromone, a pheromone atmosphere is required to be maintained during the period that intended insect pests are adults. The adult period varies with intended insect pests, and the number of repeating times of the adult period also varies with insect pests. Typically, the release is required for 1 to 10 months. In consideration of these situations, 20 mg to 50 g of a pheromone is required to be contained in a polymer tube sealed at both ends.

An apparatus for producing a polymer tube, containing a liquid substance such as a pheromone therein and being sealed at constant intervals, comprises a die configured for melt extrusion of a polymer material into at least one polymer tube; a mandrel configured to feed a liquid substance into the at least one polymer tube during the melt extrusion to obtain at least one liquid-substance-containing polymer tube; one or more take-up rollers configured to take up the at least one liquid-substance-containing polymer tube; and a pair of pressurizing members configured to discontinuously press the at least one liquid-substance-containing polymer tube between the pair of pressurizing members to cause pressure-bonding before the polymer tube solidifies.

A pair of pressurizing members is preferably a pair of rotary horns each having a protrusion, and the pair of the rotary horns discontinuously pressure-bonds the taken-up polymer tube between the protrusions to seal the polymer tube.

FIG. 1 shows a top cross-sectional view of an embodiment of apparatus for producing a polymer tube containing a liquid substance therein and sealed at constant intervals. The apparatus comprises a die 12 for melt extrusion of a polymer material P introduced into an extruder 11, into a tube through a discharge port 16 to obtain a polymer tube; a mandrel 13 for feeding a liquid substance L into the tube during the extrusion; take-up rollers 19 for taking up the extruded polymer tube; and a pair of rotary horns 17, 18 for discontinuously pressure-bonding the taken-up polymer tube between protrusions 17a, 18a for sealing before the polymer tube solidifies. In the mandrel 13, a conduit 14 for supplying the liquid substance L is provided, and the conduit 14 comprises an opening and closing valve 15 for controlling the amount of the liquid substance L to be supplied. A pair of rotary horns 17, 18 and the take-up rollers 19 are driven by corresponding motors 20, 21, which are controlled by a control board 22. The polymer tube that has been discontinuously flattened and sealed by the protrusions 17a, 18a is cooled in a cooling bath 23 such as a water bath.

Figure 2A:
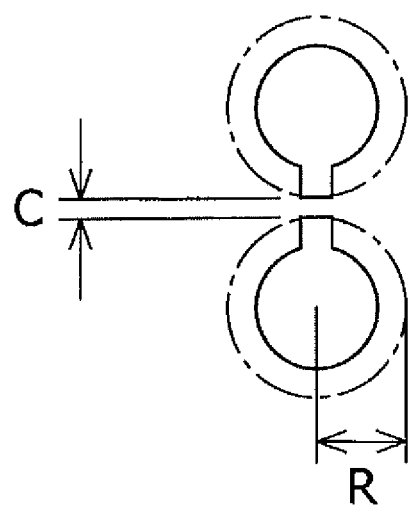
FIG. 2A shows the clearance C between a pair of rotary horns.
Figure 2B:
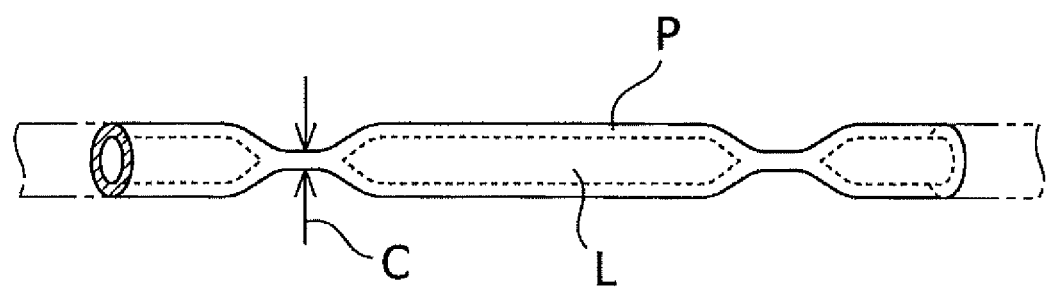
FIG. 2B shows that the clearance C is the same as the thickness of a sealed part of a polymer tube.

FIG. 2A shows the clearance C between a pair of rotary horns, and FIG. 2B shows that the clearance C is the same as the thickness of a sealed part of a polymer tube. If the leading ends of protrusions, each protrusion having a radius R, come into contact with each other, then a polymer tube is cut. Hence, the rotary horns are preferably selected to make a clearance C of 0.3 to 1.0 mm to prevent the leading ends from coming into contact with each other.

Figure 3:
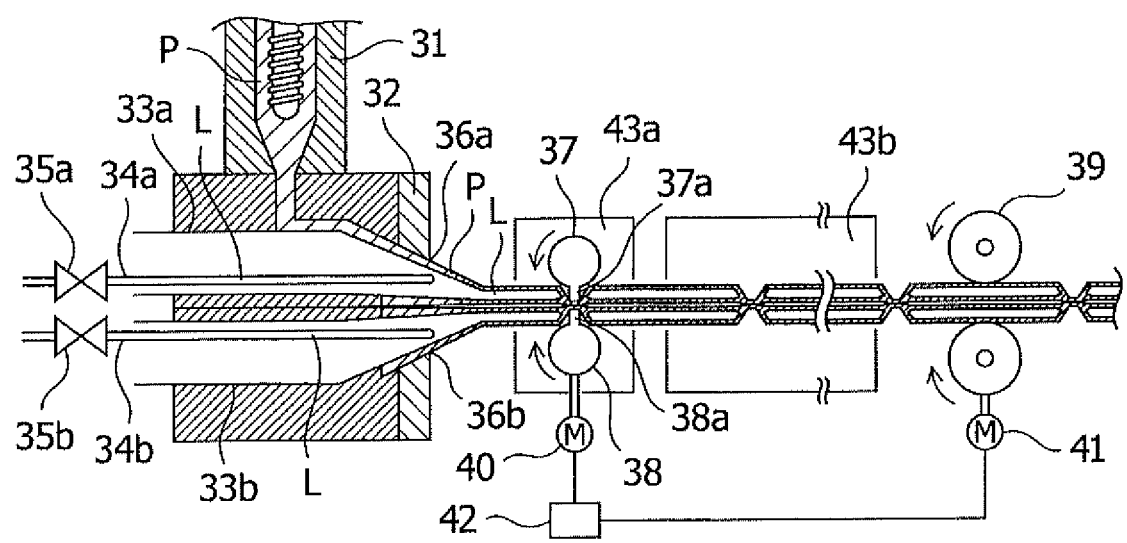
FIG. 3 is a top cross-sectional view of an embodiment of apparatus for producing two horizontally aligned polymer tubes, pressed in the horizontal direction for sealing and thereby simultaneously connected each other at constant intervals, each polymer tube containing a liquid substance therein.

FIG. 3 shows a top cross-sectional view of an embodiment of apparatus for producing two horizontally aligned polymer tubes, pressed in the horizontal direction for sealing and thereby simultaneously connected each other at constant intervals, each polymer tube containing a liquid substance therein. The apparatus comprises a die 32 for melt extrusion of a polymer material P introduced into an extruder 31, into a tube through discharge ports 36a, 36b to obtain two polymer tubes; mandrels 33a, 33b for feeding a liquid substance L into the tubes during the extrusion; take-up rollers 39 for take-up the extruded polymer tubes; and a pair of rotary horns 37, 38 for discontinuously pressure-bonding the taken-up polymer tubes between protrusions 37a, 38a for seal and connection before the polymer tubes solidify. In the mandrels 33a, 33b, conduits 34a, 34b for supplying the liquid substance L are provided, and the conduits 34a, 34b comprise opening and closing valves 35a, 35b for controlling the amount of the liquid substance L to be supplied. A pair of rotary horns 37, 38 and the take-up rollers 39 are driven by corresponding motors 40, 41, which are controlled by a control board 42. The rotary horns 37, 38 are placed in a cooling bath 43a such as a water bath, and the polymer tubes discontinuously flattened for seal and connection are cooled in a cooling bath 43b such as a water bath.

Figure 4:
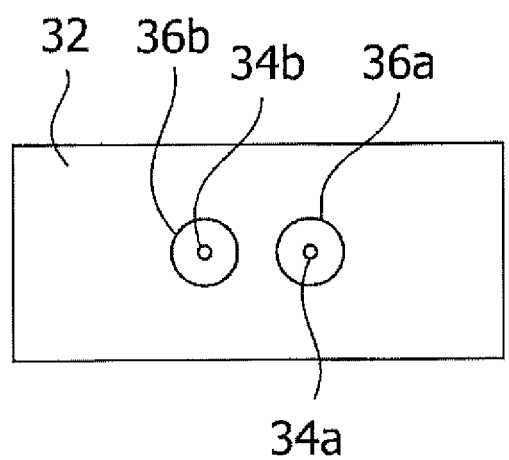
FIG. 4 shows discharge ports of a die in the apparatus in FIG. 3.

FIG. 4 shows the discharge ports 36a, 36b of the die 32 in the apparatus in FIG. 3. The discharge ports 36a, 36b discharge not only the polymer material P but also the liquid substance L supplied from the conduits 34a, 34b.

Figure 5:
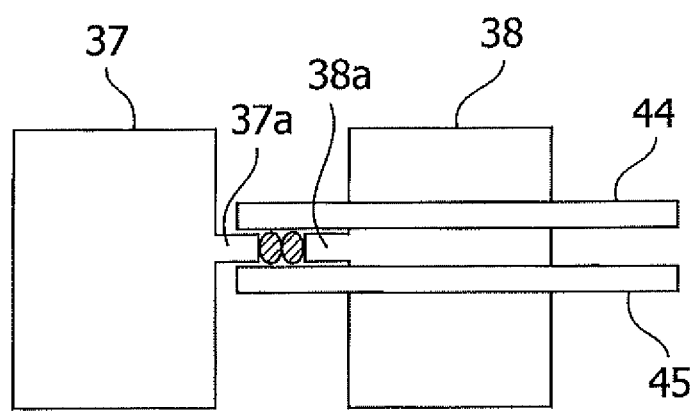
FIG. 5 shows an embodiment of vertical sealing by using guides which are positioned above and below one of the protrusions of a pair of rotary horns and which are protruding more than the protrusion.

FIG. 5 shows an embodiment of vertical sealing by using guides which are positioned above and below one of the protrusions of a pair of rotary horns and which protrude more than the protrusion. The sealing is called a vertical type because a sealed part extends vertically to the plane of polymer tubes arranged horizontally and in parallel. The pair of rotary horns 37, 38 discontinuously pressure-bond the taken-up polymer tubes between protrusions 37a, 38a for seal and connection before the polymer tubes solidify.

To prevent a liquid substance from leaking, two polymer tubes are ideally pressure-bonded vertically to the central axes of the two polymer tubes for sealing within the outer diameters of the two polymer tubes. To prevent the displacement of two polymer tubes for the above sealing, optional guides for supporting the two polymer tubes extruded may be provided around one of the protrusions of a pair of rotary horns. FIG. 5 shows a pair of guides 44, 45 positioned above and below the protrusion 38a of one of the rotary horns. The material of the guides may be any material which can prevent the displacement of polymer tubes, and more specifically, it is preferably a heat resistant resin such as polyamide and polytetraluoroethylene.

The distance between the pair of guides may be changed depending of the outer diameter of a polymer tube, and is preferably the same as the outer diameter of a polymer tube.

Figure 6:
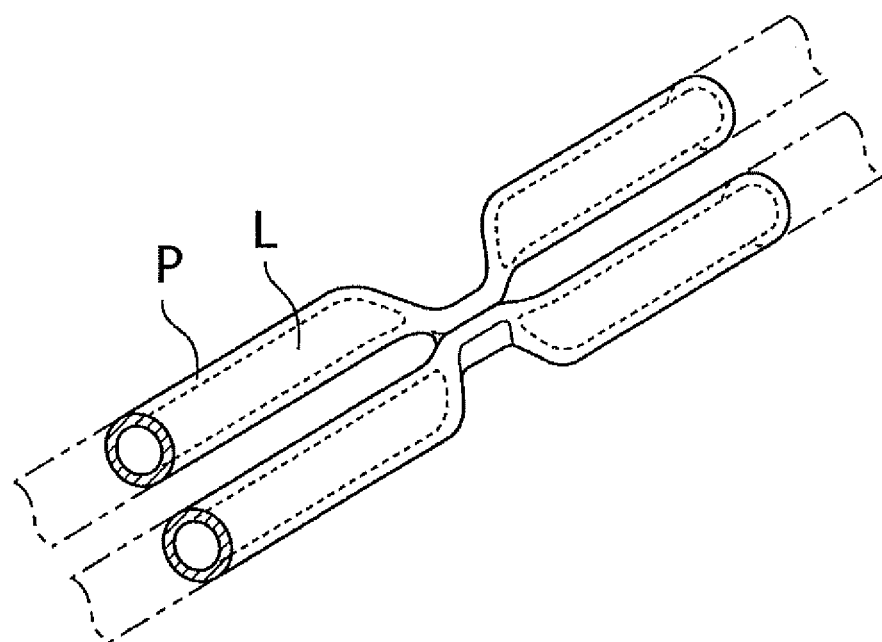
FIG. 6 shows two polymer tubes connected at a sealed part, produced by pressing the two horizontally aligned polymer tubes in the horizontal direction with the apparatus in FIG. 3.

FIG. 6 shows two polymer tubes connected at a sealed part at which the two polymer tubes are pressure-bonded in the horizontal direction, and which is produced with the apparatus in FIG. 3.

Figure 7:
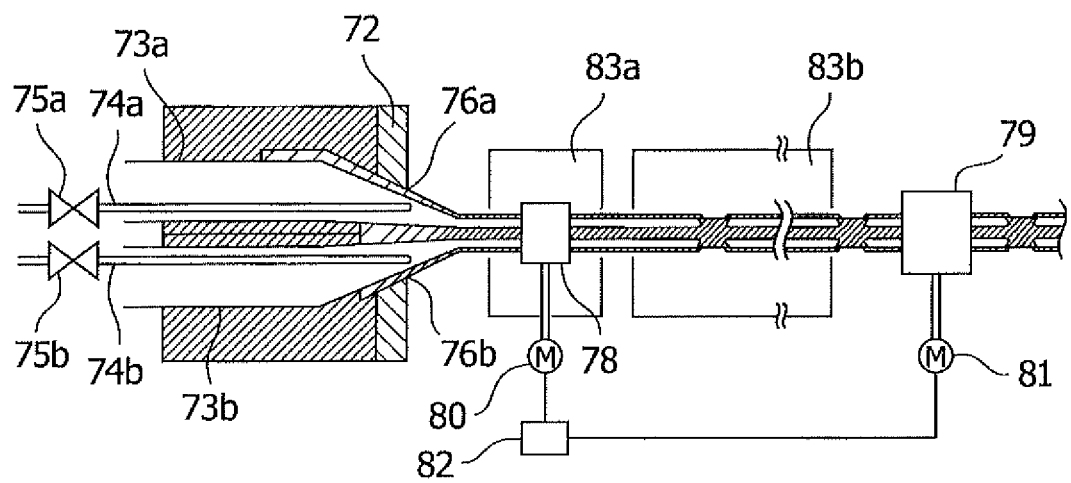
FIG. 7 is a side cross-sectional view of an embodiment of apparatus for producing two vertically aligned polymer tubes with an interconnecting web therebetween, being pressed in the horizontal direction for sealing at constant intervals and each polymer tube containing a liquid substance therein.

FIG. 7 shows a side cross-sectional view of an embodiment of apparatus for producing two vertically aligned polymer tubes with an interconnecting web therebetween, being pressed in the horizontal direction for seal at constant intervals and each polymer tube containing a liquid substance therein. The apparatus comprises a die 72 for melt extrusion of a polymer material introduced into an extruder, into a tube through discharge ports 76a, 76b to obtain two polymer tubes connected by a web; mandrels 73a, 73b for feeding a liquid substance L into the tubes during the extrusion; take-up rollers 79 for taking up the extruded polymer tubes; and a pair of rotary horns 77 (not shown), 78 for discontinuously pressure-bonding the taken-up polymer tubes between protrusions (not shown) before the polymer tubes solidify. In the mandrels 73a, 73b, conduits 74a, 74b for supplying the liquid substance L are provided, and the conduits 74a, 74b comprise opening and closing valves 75a, 75b for controlling the amount of the liquid substance L to be supplied. A pair of rotary horns 77 (not shown), 78 and the take-up rollers 79 are driven by corresponding motors 80, 81, which are controlled by a control board 82. The rotary horns 77 (not shown), 78 are placed in a cooling bath 83a such as a water bath, and the polymer tubes that have been discontinuously flattened and sealed are cooled in a cooling bath 83b such as a water bath.

Figure 8:
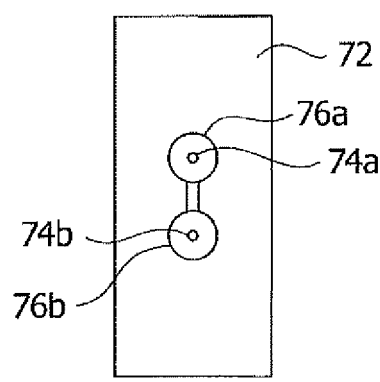
FIG. 8 shows discharge ports of a die in the apparatus in FIG. 7.

FIG. 8 shows the discharge ports 76a, 76b of the die 72 in the apparatus in FIG. 7. The discharge ports 76 discharge not only the polymer material P but also the liquid substance L supplied from the conduits 74a, 74b.

Figure 9:
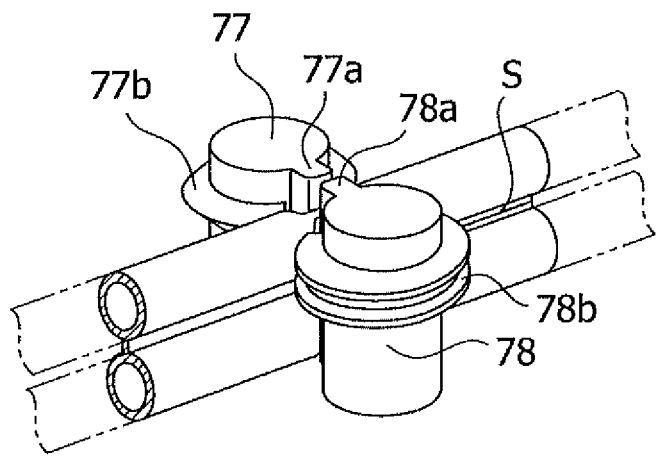
FIG. 9 shows an example of horizontal sealing in which one of a pair of rotary horns has a blade which protrudes radially higher than the protrusion on circumference.
Figure 10:
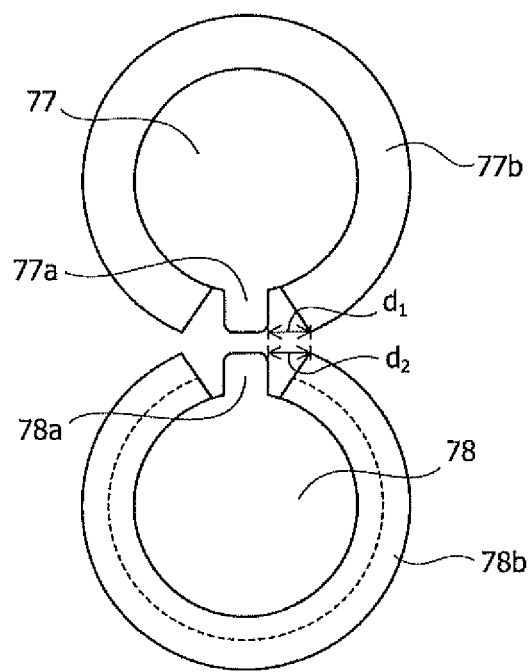
FIG. 10 shows an embodiment in which one of the rotary horns has a blade which protrudes radially higher than the protrusion on the circumference, and the other of the rotary horns has a blade receiver having a groove, the blade receiver protruding radially higher than the protrusion on the circumference and receiving the blade in the groove.

FIG. 9 and FIG. 10 show an embodiment in which one of a pair of rotary horns has a blade which protrudes radially higher than the protrusion on the circumference. The pair of rotary horns 77, 78 discontinuously pressure-bond the taken-up polymer tubes between protrusions 77a, 78a for seal before the polymer tubes solidify. The rotary horn 77 has a blade 77b which protrudes radially except at a location of the protrusion 77a and which protrudes more than the protrusion 77a. The blade 77b can form a notch S in a web in a longitudinal direction.

When one of the rotary horns has a blade which protrudes radially higher than the protrusion on the circumference, the other of the rotary horns may have a blade receiver having a groove, the blade receiver protruding radially higher than the protrusion on the circumference, and the groove receiving the blade. In FIGS. 9 and 10, the rotary horn 78 has a blade receiver with a groove for storing the blade 77b. However, one of the rotary horns 77, 78 may have a blade, while the other of the rotary horns 77, 78 may have a blade receiver with a groove.

The distance between the protrusion and the blade in the circumferential direction with respect to a rotary horn having a blade, and the distance between the protrusion and the blade receiver with a groove in the circumferential direction with respect to a rotary horn having a blade receiver with a groove, for example, d1, d2 in FIG. 10, are not limited to particular values, and are preferably 3 to 7 mm, more preferably about 5 mm.

Figure 11:
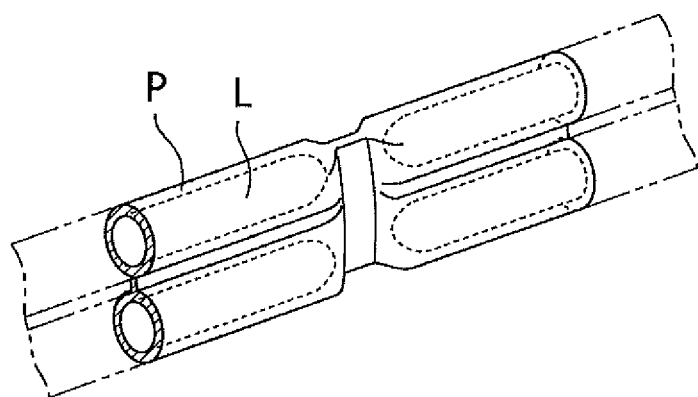
FIG. 11 shows two polymer tubes with an interconnecting web therebetween, produced by pressing the two vertically aligned polymer tubes in the horizontal direction with the apparatus in FIG. 7.

FIG. 11 shows two polymer tubes with an interconnecting web therebetween, produced by pressing the two vertically aligned polymer tubes in the horizontal direction with the apparatus in FIG. 7.

Examples of the polymer material include thermoplastics such as low-density polyethylene, high-density polyethylene, polypropylene, an ethylene-propylene copolymer, an ethylene-vinyl acetate copolymer, an ethylene-acrylic ester copolymer, polyvinyl acetate, a polyvinylchloride resin, polystyrene, a polyamide resin, polycarbonate, polyvinylidene chloride, polybutylene, a methyl methacrylate-styrene copolymer, polyacetal, cellulose acetate, cellulose-acetate butyrate, polyvinylidene fluoride, and a silicon resin. Other examples include condensation polymers of at least one dicarboxylic acid selected from the group consisting of oxalic acid, malonic acid, succinic acid, glutaric acid, adipic acid, sebacic acid, fumaric acid and maleic acid with at least one polyol selected from the group consisting of ethylene glycol, propylene glycol, butanediol, pentanediol, hexanediol, octanediol and decanediol. In addition, a condensation polymer of at least one selected from the group consisting of lactic acid, hydroxyvaleric acid, hydroxycaproic acid and hydroxy capric acid; or a thermoplastic including an aliphatic polyester of polycaprolactone may be used.

Specifically, when the polymer tube is used as a sustained-release preparation, the polymer material is appropriately selected depending on a substance to be fed. When the liquid substance is a pheromone or the like, a polyolefin such as polyethylene and polypropylene, or an ethylene-vinyl acetate copolymer is preferred in consideration of compatibility or membrane permeability.

Such a polymer material may contain a lubricant, a plasticizer, a stabilizer, a pigment, or a filler.

A liquid substance having a boiling point of 170° C. or more may be used. The temperature during extrusion is typically about 80 to 300° C. so that a liquid substance having a boiling point of less than 170° C. may partially vaporize during injection, thereby making the injection amount unstable. More specifically, for example, a pheromone, a repellent, a flavoring agent, an insect repellent, or a deodorant may be used. In particular, the pheromone includes many high-molecular-weight liquid substances having 10 or more carbon atoms and has comparatively low viscosity, so that it is suitable when the polymer tube is used as a sustained-release preparation. The liquid substance to be contained preferably has a viscosity of 10 mPa·s or less at an ambient temperature, or it may be substance which becomes a low viscosity by heating. The pheromone may be an extract from insects or the like, but it is preferably an artificially synthesized pheromone from the viewpoint of mass production.

Examples of the pheromone include a linear aliphatic aldehyde having 12 to 20 carbon atoms, a linear aliphatic acetate being saturated or having at least one double bond and having 12 to 20 carbon atoms, a linear aliphatic alcohol having 7 to 20 carbon atoms, a spiroacetal having 7 to 15 carbon atoms, a linear aliphatic ketone having 10 to 25 carbon atoms, an aliphatic hydrocarbon having 10 to 30 carbon atoms, and a carboxylic acid having 10 to 20 carbon atoms. In particular, the linear aliphatic aldehyde having 12 to 20 carbon atoms, the linear aliphatic acetate being saturated or having at least one double bond and having 12 to 20 carbon atoms, the linear aliphatic alcohol having 7 to 20 carbon atoms, or the spiroacetal having 7 to 15 carbon atoms are preferable. Specific examples include Z7Z11-hexadecadienyl acetate and Z7E11-hexadecadienyl acetate as sex pheromones of the pink bollworm (*Pectinophora gossypiella*), Z-8-dodecenyl acetate as a sex pheromone of the Oriental fruit moth (*Grapholita molesta*), E-5-decenyl acetate as a sex pheromone of the peach twig borer (*Anarsia lineatella*), Z-9-dodecenyl acetate as a sex pheromone of the grape berry moth (*Eupoecilia ambiguella*), E7Z9-dodecadienyl acetate as a sex pheromone of the European grape vine moth (*Lobesia botrana*), E-11-tetradecenyl acetate as a sex pheromone of the light brown apple moth (*Epiphyas postvittana*), E8E10-dodecadienol as a sex pheromone of the codling moth (*Cydia pomonella*). Z-11-tetradecenyl acetate as a sex pheromone of the leaf roller (Tortricidae), Z3Z13-octadecadienyl acetate and E3Z13-octadecadienyl acetate as sex pheromones of the peach tree borer (*Synanthedon exitiosa*). Z-11-hexadecenal as a sex pheromone of the American bollworm (*Helicoverpa armigera*), Z-9-hexadecenal as a sex pheromone of the oriental tobacco bud worm (*Heliothis assulta*), E8E10-dodecadienyl acetate as a sex pheromone of the soybean pod borer (*Leguminivora glycinivorella*), Z-11-hexadecenyl acetate and Z-11-hexadecenal as sex pheromones of the diamondback moth (*Plutella xylostella*), Z-11-hexadecenyl acetate, Z-11-hexadecenol and n-hexadecyl acetate as sex pheromones of the cabbage armyworm (*Mamestra brassicae*), Z9E12-tetradecadienyl acetate and Z-9-tetradecenol as sex pheromones of the beat armyworm (*Spodoptera exigua*), Z9E11-tetradecadienyl acetate and Z9E12-tetradecadienyl acetate as sex pheromones of the common cutworm (*Spodoptera litura*), Z-9-tetradecenyl acetate as a sex pheromone of the fall armyworm, E-4-tridecenyl acetate as a sex pheromone of the tomato pinworm. Z-11-hexadecenal and Z-13-octadecenal as sex pheromones of the rice stem borer (*Scirpophaga incertulas*), 5,9-dimethylpentadecane and 5,9-dimethylhexadecane as sex pheromones of the coffee leaf miner, 14-methyl-1-octadecene as a sex pheromone of the peach leaf miner (*Lyonetia clerkella* L.). Z-13-icosen-10-one as a sex pheromone of the peach fruit moth (*Carposina sasakii*), 7,8-epoxy-2-methyloctadecane as a sex pheromone of the gypsy moth (*Lymantria dispar*), Z-13-hexadecen-11-ynyl acetate as a sex pheromone of the pine processionay moth, Z-7,15-hexadecadien-4-olide as a sex pheromone of the yellowish elongate chafer (*Heptophylla picea*), n-dodecyl acetate as a sex pheromone of the sugarcane wireworm (*Melanotus okinawensis*), E-9,11-dodecadienyl butyrate and E-9,11-dodecadienyl hexanate as sex pheromones of the sugarcane wireworm (*Melanotus sakishimensis*), (R)-Z-5-(oct-1-enyl)-oxacyclopentan-2-one as a sex pheromone of the cupreous chafer (*Anomala cuprea*), hexyl hexanoate, E-2-hexenyl hexanoate and octyl butyrate as sex pheromones of the rice leaf bug (*Trigonotylus caelestialium*), hexyl butyrate, E-2-hexenyl butyrate and E-4-oxo-2-hexenal as sex pheromones of the sorghum plant bug (*Stenotus rubrovittatus*), (6R)-Z-3,9-dimethyl-6-isopropenyl-3,9-decadienyl propionate and (6R)-Z-3,9-dimethyl-6-isopropenyl-3,9-decadienol as sex pheromones of the white peach scale (*Pseudaulacaspis pentagona*), (S)-5-methyl-2-(1-propen-2-yl)-4-hexenyl 3-methyl-2-butenoate as a sex pheromone of the vine mealybug (*Planococcus ficus*), Z-9-tricosene as a sex pheromone of the housefly (*Musca domestica*), gentisyl quinone isovalerate as a sex pheromone of the German cockroach (*Blattella germanica*), and 1,7-dioxaspiro[5.5]undecane as a sex pheromone of the olive fruit fly (*Bactrocera oleae*).

Additional examples of the pheromone used in the invention include, other than the above exemplified substances, a linear aliphatic aldehyde having 12 to 20 carbon atoms, a linear aliphatic acetate being saturated or having at least one double bond and having 12 to 20 carbon atoms, a linear aliphatic alcohol having 7 to 20 carbon atoms, a spiroacetal having 7 to 15 carbon atoms, a linear aliphatic ketone having 10 to 25 carbon atoms, an aliphatic hydrocarbon having 10 to 30 carbon atoms, and a carboxylic acid having 10 to 20 carbon atoms.

Specific examples of the linear aliphatic aldehyde having 10 to 20 carbon atoms include Z-5-decenal, 10-undecenal, n-dodecanal, Z-9-dodecenal, E5Z10-dodecadienal, E8E10-dodecadienal, n-tetradecanal, Z7-tetradecenal, Z9-tetradecenal, Z11-tetradecenal, Z9E11-tetradecadienal, Z9Z11-tetradecadienal, Z9E12-tetradecadienal, Z9E11,13-tetradecatrienal, Z10-pentadecenal, E9Z11-pentadecadienal, n-hexadecanal, Z7-hexadecenal, E6Z11-hexadecadienal, E4Z6-hexadecadienal, E4E6Z11-hexadecatrienal, E10E12E14-hexadecatrienal, n-octadecanal, Z9-octadecenal, E14-octadecenal, E2Z13-octadecadienal, Z3Z13-octadecadienal, Z9Z12-octadecadienal, and Z9Z12Z15-octadecatrienal.

Specific examples of the linear aliphatic acetate being saturated or having one double bond and having 12 to 20 carbon atoms include decyl acetate, Z3-decenyl acetate, Z4-decenyl acetate, undecyl acetate, Z7-undecenyl acetate, Z8-undecenyl acetate, E9-undecenyl acetate, dodecyl acetate, E7-dodecenyl acetate, Z7-dodecenyl acetate, E8-dodecenyl acetate, E9-dodecenyl acetate, 11-dodecenyl acetate, 10-methyldodecenyl acetate, tridecyl acetate, Z4-tridecenyl acetate, E6-tridecenyl acetate, E8-tridecenyl acetate, Z8-tridecenyl acetate, tetradecyl acetate, Z7-tetradecenyl acetate, E8-tetradecenyl acetate, Z8-tetradecenyl acetate, E9-tetradecenyl acetate, Z9-tetradecenyl acetate, E10-tetradecenyl acetate, Z10-tetradecenyl acetate, E12-tetradecenyl acetate, Z12-tetradecenyl acetate, 12-methyl-tetradecenyl acetate, pentadecyl acetate, Z8-pentadecenyl acetate, E9-pentadecenyl acetate, hexadecyl acetate, Z3-hexadecenyl acetate, Z5-hexadecenyl acetate, E6-hexadecenyl acetate, Z7-hexadecenyl acetate. Z9-hexadecenyl acetate, Z10-hexadecenyl acetate, Z12-hexadecenyl acetate, heptadecyl acetate. Z11-heptadecenyl acetate, octadecyl acetate, E2-octadecenyl acetate, Z11-octadecenyl acetate, and E13-octadecenyl acetate.

Specific examples of the linear aliphatic acetate having two or more double bonds and having 12 to 20 carbon atoms include an acetate compound of a conjugated diene and/or a 1,4-pentadiene, such as Z3E5-decadienyl acetate, Z3E5-dodecadienyl acetate, E3Z5-dodecadienyl acetate. E4Z10-dodecadienyl acetate, Z5E7-dodecadienyl acetate, E5Z7-dodecadienyl acetate, Z8Z10-dodecadienyl acetate, 9,11-dodecadienyl acetate, E4Z7-tridecadienyl acetate, 11-methyl-Z9,12-tridecadienyl acetate, E3E5-tetradecadienyl acetate, E8E10-tetradecadienyl acetate, Z10Z12-tetradecadienyl acetate, Z10E12-tetradecadienyl acetate. E10Z12-tetradecadienyl acetate, E10E12-tetradecadienyl acetate, E11,13-tetradecadienyl acetate, Z8Z10-pentadecadienyl acetate, Z8E10-pentadecadienyl acetate, Z8Z10-hexadecadienyl acetate, Z10E12-hexadecadienyl acetate, Z11Z13-hexadecadienyl acetate, Z11E13-hexadecadienyl acetate, E11Z13-hexadecadienyl acetate, and Z11E14-hexadecadienyl acetate.

Specific examples of the linear aliphatic alcohol having 7 to 20 carbon atoms include a saturated linear aliphatic alcohol and a linear aliphatic alcohol having at least one double bond, such as n-heptanol, Z4-heptenol, Z6-nonenol, Z6,8-nonadienol, E6,8-nonadienol, n-decanol, Z5-decenol, E5-decenol, n-undecanol, undecenol, 11-chloro-E8E10-undecadienol, n-dodecanol, Z5-dodecenol, Z7-dodecenol, E7-dodecenol, Z8-dodecenol, E8-dodecenol, Z9-dodecenol, E9-dodecenol, E10-dodecenol, 11-dodecenol, Z5E7-dodecadienol, E5Z7-dodecadienol, E5E7-dodecadienol, Z7Z9-dodecadienol, Z7E9-dodecadienol, E7Z9-dodecadienol, 8,9-difluoro-E8E10-dodecadienol, 10,11-difluoro-E8E10-dodecadienol, 8,9,10,11-tetrafluoro-E8E10-dodecadienol, Z9,11-dodecadienol, E9,11-dodecadienol, n-tridecanol, n-tetradecanol, Z5-tetradecenol, E5-tetradecenol, Z7-tetradecenol, Z8-tetradecenol, Z11-tetradecenol, E11-tetradecenol, Z9Z11-tetradecadienol, Z9E11-tetradecadienol, Z9Z12-tetradecadienol, Z9E12-tetradecadienol, Z10Z12-tetradecadienol, E10E12-tetradecadienol, n-pentadecanol, 6,10,14-trimethyl-2-pentadecanol, n-hexadecanol, Z9-hexadecenol, Z11-hexadecenol, E11-hexadecenol, Z7Z11-hexadecadienol, Z7E11-hexadecadienol, E10Z12-hexadecadienol, E10E12-hexadecadienol, Z11Z13-hexadecadienol, Z11E13-hexadecadienol, E11Z13-hexadecadienol, E11Z13-hexadecadienol, E4Z6Z10-hexadecatrienol, E4E6Z10-hexadecatrienol, n-octadecanol, Z13-octadecenol, E2Z13-octadecadienol, Z3Z13-octadecadienol, E3Z13-octadecadienol, and n-eicosanol.

Specific examples of the spiroacetal having 7 to 15 carbon atoms include 1,6-dioxaspiro[4.5]decane, 2-ethyl-1,6-dioxaspiro[4.4]nonane, 3-hydroxy-1,7-dioxaspiro[5.5]undecane, 4-hydroxy-1,7-dioxaspiro[5.5]undecane, 7-methyl-1,6-dioxaspiro[4.5]decane, 2-methyl-1,6-dioxaspiro[4.5]decane, 2,7-dimethyl-1,6-dioxaspiro[4.4]nonane, 2,4,8-trimethyl-1,7-dioxaspiro[5.5]undecane, 2-methyl-1,7-dioxaspiro[5.5]undecane, 1,7-dioxaspiro[5.6]dodecane, 2,8-dimethyl-1,7-dioxaspiro[5.5]undecane, 2,2,8-trimethyl-1,7-dioxaspiro[5.5]undecane, 2-ethyl-1,7-dioxaspiro[5.5]undecane, 2-methyl-1,7-dioxaspiro[5.6]dodecane, 2-ethyl-7-methyl-1,6-dioxaspiro[5.6]decane, 7-ethyl-2-methyl-1,6-dioxaspiro[5.6]decane, 2,7-diethyl-1,6-dioxaspiro[4.4]nonane, 2,7-dimethyl-1,6-dioxaspiro[4.6]undecane, 2-methyl-7-propyl-1,6-dioxaspiro[4.4]nonane, 3-hydroxy-2,8-dimethyl-1,7-dioxaspiro[5.5]undecane, 2-propyl-1,7-dioxaspiro[5.5]undecane, 2-ethyl-8-methyl-1,7-dioxaspiro[5.5]undecane, 8-ethyl-2-methyl-1,7-dioxaspiro[5.5]undecane, 2,7-diethyl-1,6-dioxaspiro[4.5]decane, 2,7-dipropyl-1,6-dioxaspiro[4.4]nonane, 7-butyl-2-methyl-1,6-dioxaspiro[4.5]decane, 8-methyl-2-propyl-1,7-dioxaspiro[5.5]undecane, and 2-propyl-8-methyl-1,7-dioxaspiro[5.5]undecane.

Specific examples of the linear aliphatic ketone having 10 to 25 carbon atoms include heptadecan-2-one, Z12-nonadecen-9-one, Z6Z9-nonadecadien-3-one, Z13-icosen-10-one, Z6-heneicosen-11-one, Z6-heneicosen-9-one, Z6E8-heneicosadien-11-one, Z6E9-heneicosadien-11-one, Z6Z9-heneicosadien-11-one, and Z7-tricosen-11-one.

Specific examples of the aliphatic hydrocarbon having 10 to 30 carbon atoms include 1E11-pentadecadiene, 1Z11-pentadecadiene, 5,9-dimethylpentadecane, 2-methylhexadecane, 3,13-dimethylhexadecane, 5,9-dimethylhexadecane, n-heptadecane, 2-methylheptadecane, 2,5-dimethylheptadecane, 5-methylheptadecane, 5,11-dimethylheptadecane, 7-methylheptadecane, 7,11-dimethylheptadecane, Z3Z6Z9-heptadecatriene, Z6Z9-heptadecadiene, Z7-octadecene, 10,14-dimethyl-1-octadecene, 5,9-dimethyloctadecane, 2-methyloctadecane, 14-methyloctadecane, Z3Z6Z9-octadecatriene, n-nonadecane, 2-methylnonadecane, 9-methylnonadecane, Z3Z6Z9Z11-nonadecatetraene, 1E3Z6Z9-nonadecatetraene, Z3Z6Z9-nonadecatriene, Z6Z9-nonadecadiene, Z9-nonadecene, n-eicosane, Z9-eicosene, Z3Z6-eicosadiene, Z3Z6Z9-eicosatriene, 1Z3Z6Z9-eicosatetraene, 1Z3Z6Z9-heneicosatetraen, n-heneicosane, Z3Z6-heneicosadiene, Z6Z9-heneicosadiene, Z6Z9,20-heneicosatriene, Z3Z6Z9-heneicosatriene, Z6-13-methylheneicosene, Z9-heneicosene, n-docosene, Z3Z6Z9-docosatriene, Z6Z9-docosadiene, n-tricosane, Z7-tricosene, Z3Z6Z9-tricosatriene, Z6Z9-tricosadiene, n-tetracosane, n-pentacosane, Z3Z6Z9-pentacosatriene, n-hexacosane, n-heptacosane, n-octacosane, and n-nonacosane.

The carboxylic acid having 10 to 20 carbon atoms may be any compounds having a carboxyl group, and specific examples thereof include a carboxylic acid having two or more of methyl groups in the carbon skeleton thereof or having a double bond, such as 3,5-dimethyldodecanoic acid, Z-5-undecenoic acid, E-5-undecenoic acid, and (E,Z)-3,5-tetradecadienoic acid.

Specific examples of the attractant include an aliphatic carboxylic acid such as formic acid, acetic acid, propionic acid, n-butyric acid, isobutyric acid, n-valeric acid, isovaleric acid, caproic acid, isocaproic acid, E2-butenoic acid, 2-hydroxypropionic acid and malonic acid; an aliphatic aldehyde such as acetaldehyde, propanal, pentanal and E2-hexenal; an aliphatic ketone such as 2-butanone, pentane-2,4-dione and cyclohexanone; an aliphatic carboxylic acid ester such as ethyl lactate, ethyl acetate, isoamyl acetate, Z3-hexenyl acetate, decyl acetate, hexyl 2-methylbutyrate, butyl hexanoate, ethyl octanoate, ethyl nonanoate, ethyl decanoate, ethyl undecanoate, ethyl dodecanoate, ethyl myristate, ethyl palmitate, ethyl E2Z4-decadienoate, tert-butyl 2-methyl-4-cyclohexenecarboxylate and tert-butyl 4(or 5)-chloro-2-methyl-cyclohexanecarboxylate; an aliphatic alcohol such as ethanol, isobutyl alcohol, isopentyl alcohol, 2-ethylhexanol, Z3-hexenol, 1-octen-3-ol, nonanol, decanol, cyclohexanol, acetoin and propane 1,2-diol; an aliphatic ether such as diethyl ether and acetal; an aliphatic hydrocarbon such as α,β-ionone, undecane, tridecane, hexadecane, heptadecane and Z9-tricosene; an aromatic compound such as methyl phenylacetate, ethyl phenylacetate, propyl phenylacetate, phenethyl phenylacetate, Z3-hexenyl benzoate, eugenol, methyl isoeugenol, methyl eugenol, veratrole, 2-allyloxy-3-ethoxybenzaldehyde, 4-(p-acetoxyphenyl)-2-butanone, 4-(p-hydroxyphenyl)-2-butanone (raspberry ketone), anisylacetone, methyl anthranilate, ethyl anthranilate, benzyl salicylate, methyl salicylate, phenethyl alcohol, phenethyl propionate, phenethyl butyrate, anethole, vanillin, ethyl vanillin, isovanillin, heliotropin, piperonal acetone and phthiocol; a heterocyclic compound such as maltol, ethyl maltol, 2,5-dimethylpyrazine, γ-(4-pentenyl)-γ-butyrolactone, δ-nonyllactone and frontalin; a sulfur-containing compound such as dimethyl disulfide, dimethyl trisulfide, dipropyl disulfide, methyl isothiocyanate and 3-butenyl isothiocyanate; a nitrogen-containing compound such as trimethylamine, hexylamine, 4-diaminobutane, allylnitrile and methyl 2-amino-3-methylvalerate; and a terpene compound such as geraniol, farnesol, linalool, linalool oxide, citronellol, cineol, geranyl acetate, citronellyl acetate, citral, carvone, d-limonene, β-pinene, farnesene and 4,8-dimethyl-1,E3,7-nonatriene.

Other specific examples of the attractant include an essential oil such as an angelica oil, a citronella oil and a mustard oil; and an extract from a plant such as aloe and eucalyptus.

Specific examples of the repellent include an aliphatic carboxylic acid such as Z9Z12-octadienoic acid and 3,7,11-trimethyl-6,10-dodecadienoic acid; an aliphatic aldehyde such as E2-hexenal, Z2E6-3,7-dimethyloctadienal, 3,7-dimethyl-6-octenal and E2Z6-nonadienal; an aliphatic ketone such as 2-heptanone, 2-dodecanone, 2-tridecanone, 3-methyl-2-cyclohexenone, E3E5-octadien-2-one and E3Z7-decadien-2-one; an aliphatic carboxylic acid ester such as butyl acetate, octyl acetate, methyl myristate, methyl palmitate and methyl 6-n-pentylcyclohexene-1-carboxylate; an aliphatic alcohol such as octanol, 1-octen-3-ol, 2-ethyl-1,3-hexanediol, menthol and n-hexyltriethylene glycol monoether; an aliphatic hydrocarbon such as tridecane; an aromatic compound such as cinnamic alcohol, cinnamic aldehyde, methyleugenol, phenylacetaldehyde, benzaldehyde, anethole, diethyltoluamide, N,N-diethyl-3-methylbenzamide (DEET), dimethyl phthalate, dioctyl phthalate and naphthalene; a heterocyclic compound such as γ-nonyllactone, butyl 3,4-dihydro-2,2-dimethyl-4-oxo-2H-pyran-6-carboxylate, furfural and 4-octanoylmorpholine; a sulfur-containing compound such as propyl isothiocyanate; a nitrogen-containing compound such as methylpiperidine, 2,6-dimethylpiperidine and 2-ethylpiperidine; and a terpene compound such as geraniol, cineole, linalool, terpineol, citral, citronellal, neryl formate, α-pinene, carvone, d-limonene and camphor.

Additional examples may include an essential oil such as a rose geranium oil, a sandalwood oil, a pepper oil (peppermint oil) and a lemongrass oil; and an extract from a plant such as cinnamon, camphor, clover, thyme, geranium, bergamot, laurel, pine, *Betula lenta*, pennyroyal, eucalyptus and margosa.

Moreover, a pyrethroid compound such as pyrethrin, allethrin, phthalthrin, resmethrin, flumethrin, phenothrin, permethrin, cyphenothrin, prallethrin, etofenprox, empenthrin and transfluthrin may also be used.

EXAMPLES

Example 1

As described below, there is provided a high-density polyethylene tube containing Z-11-tetradecenyl acetate, which is a sex pheromone of the leaf roller, and having an inner diameter of 1.0 mm and a wall thickness of 0.40 mm, wherein the tube is sealed at intervals of 200 mm and used for sustained-release sex pheromone preparations.

By using an extruder with a crosshead and a die, a tube was extruded from the die at 250° C. The extruded tube was taken up by take-up rollers at a speed of 80 m/min. Although the tube becomes thinner by take-up from the discharge port, the tube was continuously taken up at a constant speed to control the amount of the extruded polymer material so that the outer diameter and the wall thickness of the tube were adjusted. In a pore provided in a mandrel inserted into the die, a conduit communicating with the outside and being switchable to inject air or a liquid was provided. By controlling the amount of air fed into the conduit, the inner diameter of a tube was adjusted. The dimensions of an intended tube were selected by controlling the take-up speed, the extruded amount of polymer material and the amount of air, and then the conduit was switched to feed a liquid substance at a flow rate of 62.8 g/min which corresponded to the inner diameter of the polymer tube to obtain a long polymer tube containing the liquid substance therein concurrently with the extrusion. The flow rate of the liquid substance was able to be calculated in accordance with $\pi r^2 dv$ wherein r is the radius of an inner diameter, $\pi$ is the circle ratio, d is the density of a liquid, and v is a take-up speed.

As a device for pressure-bonding the polymer tube extruded from the discharge port before introduction into a cooling bath for solidification, two rotary horns having respective protrusions (each horn having one protrusion) were placed between the discharge port of the die and a water bath, so that the protrusions came into contact with and pressed the polymer tube to cause pressure-bonding. Each rotary horn with the protrusion was a cylindrical rotary horn having a radius (including the protrusion) of 31.85 mm. Accordingly, each rotary horn had an outer periphery of 200 mm. The two protrusions come into contact with and pressure-bond a polymer tube, but if the protrusions come into contact with each other, the polymer tube is cut. Hence, the two rotary horns were placed away from each other to make a clearance of 0.5 mm so that the polymer tube having an outer diameter 1.8 mm was flattened to 0.5 mm. Each rotary horn was rotated at a speed of 400 rpm so that the peripheral speed of each protrusion was the same as the take-up speed of 80 m/min. The speed of a rotary motor for the take-up rollers was measured, and electric signals were sent to a rotary motor controller of the rotary horns for pressure-bonding, thereby controlling the peripheral speed of the rotary horns for pressure-bonding. Thus, even when there is a change in the rotation speed of the rotary motor for the take-up rollers, for example, owing to a change in voltage, the peripheral speeds of the rotary horns for pressure-bonding were controlled so that constant sealing pitches were able to be maintained.

Example 2

As described below, there are provided two ethylene-vinyl acetate copolymer (having vinyl acetate content of 4% by mole) tubes, each tube containing therein E8E10-dodecadienol, which is a sex pheromone of codling moth, and having an inner diameter of 1.2 mm and a wall thickness of 0.50 mm, wherein the two horizontally aligned tubes are sealed and thereby connected horizontally at intervals of 200 mm and are used for sustained-release sex pheromone preparations.

By using an extruder with a crosshead and a die, two tubes were extruded from the die at 175° C. The extruded tubes were taken up by take-up rollers at a speed of 60 m/min. Although the tubes become thinner by take-up from the discharge ports, the tubes were continuously taken up at a constant speed to control the amount of the extruded polymer material so that the outer diameter and the wall thickness of each tube were adjusted. In a pore provided in each of two mandrels inserted into the die, a conduit communicating with the outside and switchable to inject air or a liquid was provided. By controlling the amount of air fed into the conduit, the inner diameter of each tube was adjusted. The dimensions of each intended tube were selected by the controlling the take-up speed, the extruded amount of polymer material and the amount of air, and then the conduit was switched to feed a liquid substance at a flow rate of 59.7 g/min which corresponded to the inner diameter of each polymer tube to obtain two long polymer tubes containing the liquid substance therein concurrently with extrusion. The flow rate of the liquid substance was able to be calculated in accordance with $\pi r^2 dv$ mentioned above.

As a device for pressure-bonding the polymer tubes extruded from the discharge ports before introduction into a cooling bath for solidification, two rotary horns having respective protrusions (each horn having one protrusion) were placed in a first water bath which was placed next to the discharge ports of the die and which was controlled to have a water bath temperature of 80° C., so that the protrusions came into contact with and pressed the polymer tubes to cause pressure-bonding. Each rotary horn with the protrusion was a cylindrical rotary horn having a radius (including the protrusion) of 63.7 mm. Accordingly, each rotary horn had an outer periphery of 400 mm. The two protrusions come into contact with and pressure-bond polymer tubes, but if the protrusions come into contact with each other, the polymer tubes are cut. Hence, the two rotary horns were placed away from each other to make a clearance of 0.7 mm so that the two polymer tubes, each tube having an outer diameter of 2.2 mm, were flattened to 0.7 mm. Each rotary horn was rotated at a speed of 300 rpm so that the peripheral speed of each protrusion was the same as the take-up speed of 60 m/min. The speed of a rotary motor for the take-up rollers was measured, and electric signals were sent to a rotary motor controller of the rotary horns for pressure-bonding, thereby controlling the peripheral speed of the rotary horns for pressure-bonding. Thus, even when there is a change in the rotation speed of the rotary motor for the take-up rollers, for example, owing to a change in voltage, the peripheral speeds of the rotary horns for pressure-bonding were controlled so that constant sealing pitches were able to be maintained.

Example 3

As described below, there are provided two tubes connected by a web, each tube containing therein a mixture of Z-11-hexadecenyl acetate and Z-11-hexadecenal at weight ratio of 1:1, which are sex pheromone substances of diamondback moth, being made from a copolymer of polybutylene succinate and polybutylene adipate (trade name: Bionolle #3010, product of Showa Highpolymer Co., Ltd.) and having an inner diameter of 1.04 mm and a wall thickness of 0.35 mm, wherein the two horizontally aligned tubes are horizontally pressed for sealing at intervals of 1,000 mm and are used for sustained-release sex pheromone preparations.

By using an extruder with a crosshead and a die, two tubes connected by a web were extruded from the die at 140° C. The width of a slit in a die (the minimum distance between the outer peripheries of pores in a die) was 3.5 mm and the thickness of the slit, which was perpendicular to the width, was 0.20 mm. The extruded tubes were taken up by take-up rollers at a speed of 50 m/min. Although the tubes become thinner by being taken up from the discharge ports, the tubes were continuously taken up at a constant speed to control the amount of the extruded polymer material so that the outer diameter and the wall thickness of each tube were adjusted. In a pore provided in each of two mandrels inserted into the die, a conduit communicating with the outside and switchable to inject air or a liquid was provided. By controlling the amount of air fed into the conduit, the inner diameters of each tube was adjusted. The dimensions of each intended tube were selected by controlling the take-up speed, the extruded amount of polymer material and the amount of air, and then the conduit was switched to feed a liquid substance at a flow rate of 37.4 g/min which corresponded to the inner diameter of each polymer tube to obtain two long polymer tubes containing the liquid substance therein concurrently with extrusion. The flow rate of the liquid substance was able to be calculated in accordance with $\pi r^2 dv$ mentioned above.

As a device for pressure-bonding the polymer tubes extruded from the discharge ports before introduction into a cooling bath for solidification, two rotary horns having respective protrusions (each horn having one protrusion) were placed in a first water bath which was placed next to the discharge ports of the die and which was controlled to have a water bath temperature of 60° C., so that the protrusions came into contact with and pressed the polymer tubes to cause pressure-bonding. Each rotary horn with the protrusion was a cylindrical rotary horn having a radius (including the protrusion) of 31.85 mm. Accordingly, each rotary horn had an outer periphery of 200 mm. The two protrusions come into contact with and pressure-bond polymer tubes, but if the protrusions come into contact with each other, the polymer tubes are cut. Hence, the two rotary horns were placed away from each other to make a clearance of 0.5 mm so that the two polymer tubes, each tube having an outer diameter of 1.74 mm, were flattened to 0.5 mm. The two horizontally aligned polymer tubes connected by a web were taken up between two rotary horns so that the two polymer tubes were pressed horizontally by the protrusions. The rotating speed of the rotary horns corresponded to the take-up speed of 50 m/min, and the rotary horns were stopped for 0.96 seconds and then rotated once for 0.24 seconds. This cycle was repeated to achieve the sealing at each pitch of 1,000 mm. The speed of a rotary motor for the take-up rollers was measured, and electric signals were sent to a rotary motor controller of the rotary horns for pressure bonding, thereby controlling the peripheral speed of the rotary horns for pressure-bonding. Thus, even when there is a change in the rotation speed of the rotary motor for the take-up rollers, for example, owing to a change in voltage, the peripheral speeds of the rotary horns for pressure-bonding were controlled so that constant sealing pitches were able to be maintained.

Example 4

As described below, there are provided two high-density polyethylene tubes connected by a notched web, each tube containing E,Z-7,9-dodecadienyl acetate, which is a sex pheromone of the European grape vine moth, and having an inner diameter of 1.40 mm and a wall thickness of 0.40 mm, wherein the two vertically aligned tubes are horizontally pressed for sealing at intervals of 200 mm and are used for annular sustained-release sex pheromone preparations.

By using an extruder with a crosshead and a die, two tubes connected by a web were extruded from the die at 280° C. The width of a slit in a die (the minimum distance between the outer peripheries of pores in a die) was 4.5 mm and the thickness of the slit, which was perpendicular to the width, was 0.10 mm. The extruded tubes were taken up by take-up rollers at a speed of 50 m/min. Although the tubes become thinner by being taken up from the discharge ports, the tubes were continuously taken up at a constant speed to control the amount of the extruded polymer material so that the outer diameter and the wall thickness of each tube were adjusted. In a pore provided in each of two mandrels inserted into the die, a conduit communicating with the outside and switchable to inject air or a liquid was provided. By controlling the amount of air fed into the conduit, the inner diameters of each tube was adjusted. The dimensions of each intended tube were selected by controlling the take-up speed, the extruded amount of polymer material and the amount of air, and then the conduit was switched to feed a liquid substance at a flow rate of 67.7 g/min which corresponded to the inner diameter of each polymer tube to obtain two long polymer tubes containing the liquid substance therein concurrently with extrusion. The flow rate of the liquid substance was able to be calculated in accordance with $\pi r^2 dv$ mentioned above.

As a device for pressure-bonding the polymer tubes extruded from the discharge ports before introduction into a cooling bath for solidification, two rotary horns having protrusions (each horn having one protrusion) were placed in a first water bath which was placed next to the discharge ports of the die and which was controlled to have a water bath temperature of 30° C., so that the protrusions came into contact with and pressed the tubes to cause pressure-bonding. One rotary horn had a blade which was located at 5 mm apart from each side of the protrusion and at the corresponding location for cutting the web, while the other rotary horn had a blade receiver with a groove, the receiver protruding radially and being located at 5 mm apart from each side of the protrusion. Each rotary horn with the protrusion was a cylindrical rotary horn having a radius (including the protrusion) of 31.85 mm. Accordingly, each rotary horn had an outer periphery of 200 mm. The two protrusions come into contact with and pressure-bond polymer tubes, but if the protrusions come into contact with each other, the tubes are cut. Hence, the two rotary horns were placed away from each other to make a clearance of 0.6 mm so that the two tubes, each tube having an outer diameter of 2.2 mm, were flattened to 0.6 mm. The two tubes were taken up so as to allow the two vertically aligned tubes to be pressed in the horizontal direction between the two rotary horns. The rotary horns were rotated at a speed of 250 rpm so that the peripheral speed of the protrusions was the same as the take-up speed of 50 m/min. When the two tubes with web were being taken up, the rotary horns were rotated so that the blade came into contact with the web and the groove, thereby notching the web. The speed of a rotary motor for the take-up rollers was measured, and electric signals were sent to a rotary motor controller of the rotary horns for pressure-bonding. Thus, even when there is a change in the rotation speed of the rotary motor for the take-up rollers, for example, owing to a change in voltage, the peripheral speeds of the rotary horns for pressure-bonding were controlled so that constant sealing pitches were able to be maintained.

The invention claimed is:

1. An apparatus for producing a polymer tube, containing a liquid therein and being sealed at constant intervals, the apparatus comprising:
 a die configured for melt extrusion of a polymer material into at least one tube;
 a mandrel configured to feed a liquid into the at least one tube during the melt extrusion to obtain at least one liquid-containing tube;
 one or more rollers configured to take up the at least one liquid-containing tube; and
 a pair of pressurizing members configured to discontinuously press the at least one liquid-containing tube between the pair of pressurizing members to cause pressure-bonding before the tube solidifies, wherein the pair of pressurizing m embers is a pair of rotary horns, each horn having a protrusion, and the pair of rotary horns is configured to discontinuously press the at least one liquid-containing tube between the protrusions to cause pressure-bonding.

2. The apparatus according to claim 1, wherein the die comprises two discharge pores and a slit connecting the two discharge ports, and one of the rotary horns has a blade which protrudes radially higher than the protrusion on the circumference.

3. The apparatus according to claim 1, comprising a guide configured to support the at least one liquid-containing tube and placed around the protrusion of one of the rotary horns.

4. The apparatus according to claim 1, further comprising a cooling bath configured to cool the discontinuously pressed tube.

5. The apparatus according to claim 2, further comprising a cooling bath configured to cool the discontinuously pressed tube.

6. The apparatus according to claim 3, further comprising a cooling bath configured to cool the discontinuously pressed tube.

* * * * *